(12) United States Patent
Roush

(10) Patent No.: US 7,305,669 B2
(45) Date of Patent: Dec. 4, 2007

(54) SOFTWARE UPGRADES WITH MULTIPLE VERSION SUPPORT

(75) Inventor: Ellard T. Roush, Burlingame, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 794 days.

(21) Appl. No.: 10/260,183

(22) Filed: Sep. 27, 2002

(65) Prior Publication Data

US 2004/0216133 A1    Oct. 28, 2004

(51) Int. Cl.
  *G06F 9/44*   (2006.01)
  *G06F 3/00*   (2006.01)
(52) U.S. Cl. ...................... 717/170; 719/303
(58) Field of Classification Search ........... 707/203; 709/223–224; 717/170; 719/313
  See application file for complete search history.

(56) References Cited

U.S. PATENT DOCUMENTS

| | | | | |
|---|---|---|---|---|
| 5,442,766 A | * | 8/1995 | Chu et al. | 711/204 |
| 5,926,636 A | * | 7/1999 | Lam et al. | 719/313 |
| 5,974,428 A | * | 10/1999 | Gerard et al. | 707/203 |
| 6,704,432 B2 | * | 3/2004 | Eversole et al. | 382/100 |
| 6,738,801 B1 | * | 5/2004 | Kawaguchi et al. | 709/208 |
| 6,842,264 B1 | * | 1/2005 | Leyva et al. | 358/1.15 |
| 2003/0149970 A1 | * | 8/2003 | Shanbhogue et al. | 717/170 |

OTHER PUBLICATIONS

Rousch, Ellard T., "Cluster Rolling Upgrade Using Multiple Version Support," Sun Microsystems, Inc., pp. 1-8.

* cited by examiner

*Primary Examiner*—Meng-Al T. An
*Assistant Examiner*—Camquy Truong
(74) *Attorney, Agent, or Firm*—Hickman Palermo Truong & Becker LLP

(57) ABSTRACT

A method and system thereof for supporting multiple versions of software, such as software organized as components or objects. In one embodiment, a software component (e.g., a new object) is implemented on a server node. A translator is created on the server node. The translator provides an interface to the new object for an invocation request associated with a different version of the object (e.g., an older version of the object). The new object is referenced by one identifier, and the translator is referenced by another identifier. In essence, the translator provides a form of version transparency.

24 Claims, 11 Drawing Sheets

SOFTWARE UPGRADES WITH MULTIPLE VERSION SUPPORT

FIELD OF THE INVENTION

Embodiments of the present invention relate to computer system software. More specifically, embodiments of the present invention relate to upgrades of software used across clusters of computer systems.

BACKGROUND ART

The use of clusters of computers systems is becoming more widespread. As used herein, a cluster refers to a collection of computer systems that can function independently and that are connected by a communications network and optionally by multi-hosted disks.

A desirable attribute of a network is that it provides high availability. High availability can be provided by using fault-tolerant systems, but such systems can be expensive. Clusters take advantage of commodity (e.g., off-the-shelf) hardware to provide high availability at a lower cost.

Generally speaking, a cluster is created out of a collection of computer systems running a common cluster operating system. Prior Art FIG. 1 is a block diagram showing the infrastructure of a cluster operating system according to one embodiment of the prior art. Here, the cluster comprises a client node 110 coupled to a server node 120; however, a cluster will typically include many such nodes. The client node 110 and the server node 120 may be co-located on a single computer system or they may reside on different computer systems in communication with each other.

In a cluster operating system such as that illustrated by Prior Art FIG. 1, software is organized into components, typically objects and specifically CORBA (Common Object Request Broker Architecture) objects; however, the objects in a cluster operating system need not be strictly CORBA-compliant. The public interface for each server (implementation) object is provided by an Interface Definition Language (IDL) specification. An IDL compiler generates a unique identifier (a "TypeID") for each interface. An object and communication subsystem, called the Object Request Broker (ORB), provides the functionality to connect clients and servers. Client access to server objects is via method invocations using CORBA object references. The IDL compiler also generates both server-side and client-side support for method invocations.

On the server side, another software component—the server handler—supports operations on the implementation object. Each object is associated with a handler on the server side and a handler on the client side (the client handler). The handler marshals and unmarshals references to the implementation object, among other functions.

Objects do not change locations; instead, object references are passed from node to node. Another server-side software component—the server xdoor (extended door)—encapsulates information about the server object supported by this xdoor and information about the location of object references on other nodes for this specific server object. Essentially, an xdoor is a mechanism by which a thread in one domain may place a call to an object in another domain.

On the client side, a similar infrastructure is used. A client xdoor encapsulates server location information. A client handler supports infrastructure operations. A proxy acts as a representative of the implementation object on the server. The proxy forwards method invocations to the implementation object on the server.

As mentioned above, a desirable attribute of a cluster is its high availability. To maintain high availability during a software change across the cluster—for example, a change to the cluster operating system—rolling upgrades are commonly used.

A typical rolling upgrade works as follows. One computer system in the cluster is taken out of service and new software installed. The computer system is then returned to service. The process is repeated for each computer system in the cluster. Thus, clusters can continue to provide high availability during software changes because only one computer system is shut down to install software, leaving other systems in the cluster up and running. On larger clusters that can withstand multiple systems being out of service, multiple computer systems can be upgraded at the same time.

A disadvantage to the rolling upgrade approach is that, until the rolling upgrade is completed, different systems in the cluster will be using different versions of software. This may lead to contention or compatibility issues when the systems try to communicate.

Another approach for implementing software changes across a cluster involves de-activating (quiescing) the software components to be changed, substituting new software components, and then resuming activities with the new software components. However, a quiescing operation needs to overcome issues such as time constraints for completing the software change and deadlock resulting from attempts to use the quiescent software. This type of approach also has to resolve a wide range of both inter-node and intra-node interactions, and does not address the issues associated with the use of different versions of software on different computer systems.

Thus, a method and/or system for implementing software changes across a cluster (or network) of computer systems that does not engender the problems described above, or that is able to overcome those problems, would be advantageous. The present invention provides a novel solution to those problems.

SUMMARY OF THE INVENTION

Embodiments of the present invention pertain to a method and system thereof for supporting multiple versions of software, including software that is organized as components, such as objects. In one embodiment, the software components are Common Object Request Broker Architecture (CORBA) objects, with identifiers provided by an Interface Definition Language (IDL) specification.

In one such object-oriented embodiment, an updated or upgraded software component (e.g., a newer version of an implementation object) is implemented on a server node. In this embodiment, a translator is also created on the server node. The translator provides an interface to the newer version of the component for an invocation request that is associated with a different version of the component (e.g., an older version of the implementation object). In essence, the translator provides a form of version transparency.

In one embodiment, the newer version of the software component is referenced by one identifier, and the translator is referenced by another identifier. An invocation request from a client node that supports the newer version of the software component will be referenced to the component itself (e.g., to the implementation object), while an invocation request from a client node that supports the older version of the component will be referenced to the translator.

In one embodiment, on the server node, when a newer version of a software component (e.g., an implementation object) is created, a translator is created for the preceding (e.g., older) version of the software component (a translator may be created for each older version). A handler—for marshaling and unmarshaling references—is created for the software component and another handler is created for the associated translator.

According to one embodiment of the present invention, the software component (e.g., the implementation object) and the associated translator are represented by a single server node xdoor or by a single address or the like. In one such embodiment, an index (also referred to herein as a vertex) is created on the server node. The vertex includes the identifiers for the software component and the associated translator. The index (vertex) is used to link an invocation request to either the software component or to the translator, according to the identifier provided by the invocation request.

In one object-oriented embodiment, identifiers for the software component (e.g., the implementation object) and for the translator are provided to a client node by the server node, and the client node creates an xdoor. In one embodiment, the client node selects the identifier associated with a version of the software component that the client node can support; for example, the client node can select the identifier for the newest version of the implementation object that it can support. In another embodiment, the client node maintains a listing or index (a vertex) that includes all of the identifiers, not just the identifier selected. The client node creates a handler and a proxy for the version of the software component supported by the client.

In one embodiment, an invocation request from the client node will reference the identifier for the version of the software component (e.g., implementation object) supported by the client node. At the vertex on the server node, the invocation request is forwarded to the appropriate destination according to the identifier associated with the invocation request. For example, an invocation request associated with the newer version of an implementation object will be forwarded to the implementation object, while an invocation request associated with another version of the implementation object will be forwarded to the translator associated with that version.

According to the various embodiments of the present invention, there may be a "one-to-one" relationship between the old and new interfaces, a "many-to-one" relationship between the old and new interfaces, or a "one-to-many" relationship between the old and new interfaces. In the one-to-one case, a new interface to the translator replaces the old interface to the software component (e.g., implementation object). In the many-to-one case, one new interface replaces two or more old interfaces. In the one-to-many case, two or more new interfaces replace one old interface.

While embodiments of the present invention have been described above in the context of an object-oriented (e.g., CORBA-like) infrastructure, features of the present invention can be extended to systems that, in general, organize software into components, encapsulate address information, access software by reference, and/or have clearly defined public interfaces.

In summary, in its various embodiments, the present invention allows upgrades to software to be made without interrupting service. Different versions of software can interoperate. Older versions of the software do not require knowledge of the newer version. The overhead associated with software upgrades—for example, the scope of changes and the corresponding amount of effort—can be reduced. These and other objects and advantages of the various embodiments of the present invention will become recognized by those of ordinary skill in the art after having read the following detailed description of the embodiments that are illustrated in the various drawing figures.

BRIEF DESCRIPTION OF THE DRAWINGS

The accompanying drawings, which are incorporated in and form a part of this specification, illustrate embodiments of the present invention and, together with the description, serve to explain the principles of the invention.

PRIOR ART

DETAILED DESCRIPTION OF THE INVENTION

Figure 1:
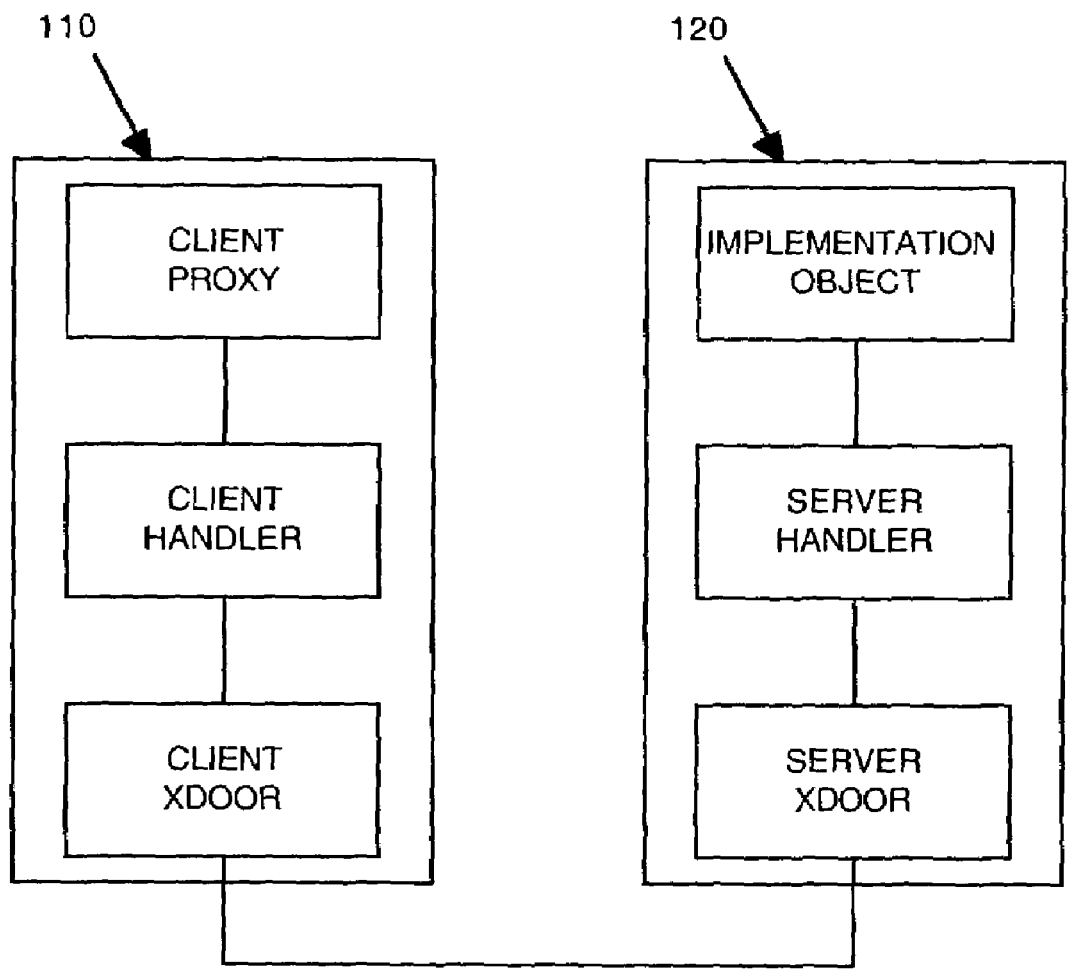
FIG. 1 illustrates an object-oriented software infrastructure according to one embodiment of the prior art.

Reference will now be made in detail to the various embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be understood that the present invention may be practiced without these specific details. In other instances, well-known methods, procedures, components, and circuits have not been described in detail so as not to unnecessarily obscure aspects of the present invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "implementing," "creating," "specifying," "sending" or "receiving" or "selecting" or "forwarding" or "maintaining" or "executing" or "locating" or "linking" or "referencing" or the like, refer to actions and processes (e.g., flowcharts 700, 800 and 900 of FIGS. 7, 8 and 9, respectively) of a computer system or similar electronic computing device. The computer system or similar electronic computing device manipulates and transforms data represented as physical (electronic) quantities within the computer system memories, registers or other such information storage, transmission or display devices. The present invention is well suited to use with other computer systems.

Figure 2:
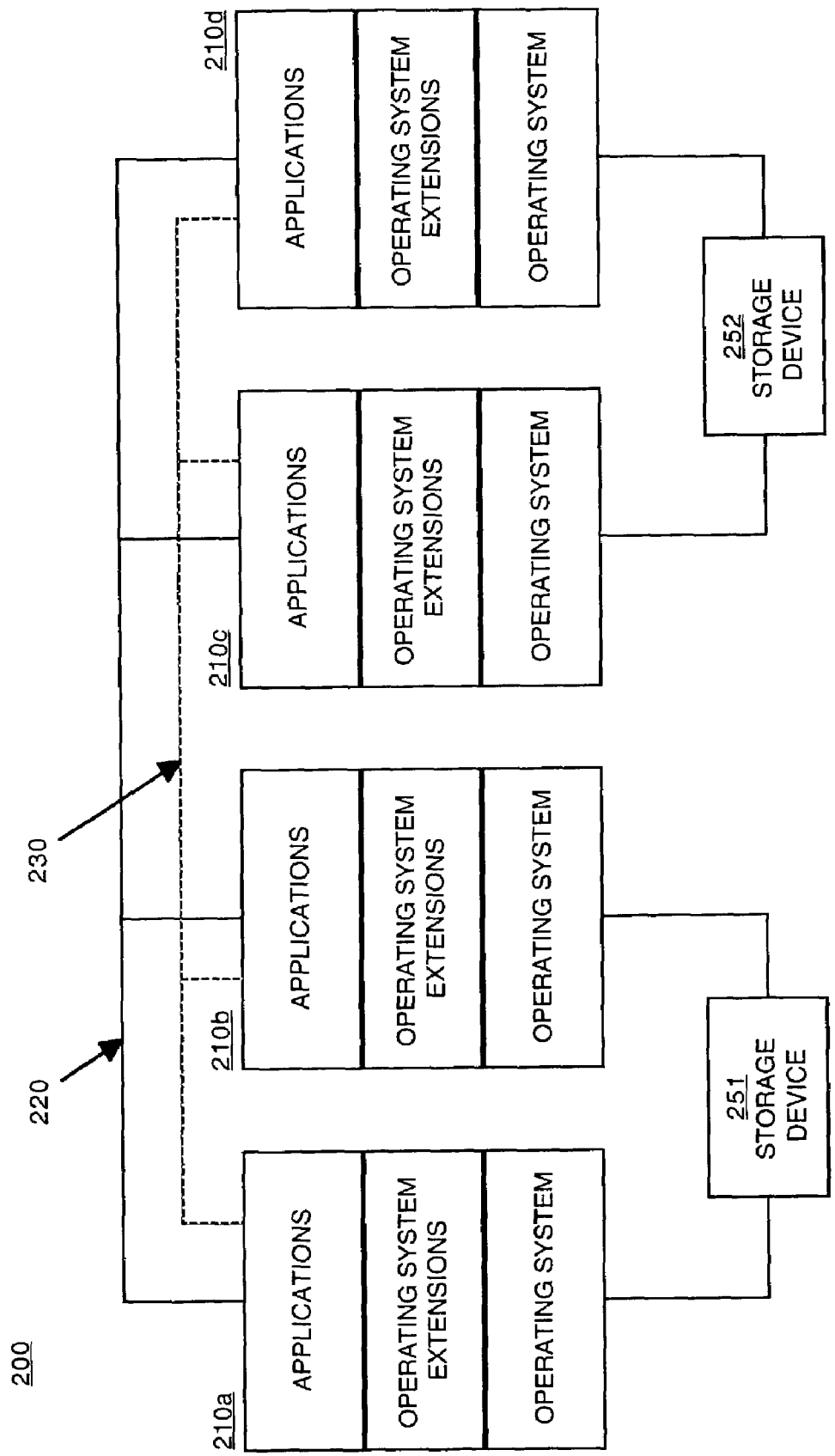
FIG. 2 illustrates a cluster of computer systems upon which embodiments of the present invention can be implemented.

FIG. 2 illustrates a cluster 200 of computer systems 210a, 210b, 210c and 210d, upon which embodiments of the present invention can be implemented. The computer systems 210a-d include, in general, a processor for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

In the present embodiment, the computer systems 210a-d are coupled by redundant interconnects 220 and 230, which may be wired or wireless connections. Cluster 200 may optionally include multi-hosted disks (shared memory devices) embodied in FIG. 2 as storage devices 251 and 252.

The computer systems 210a-d each run a common operating system including extensions, as well as other applications. The applications may vary from computer system to computer system. In one embodiment, the cluster operating system and extensions are organized as software components, typically objects. In one such embodiment, the cluster operating system and extensions are organized as Common Object Request Broker Architecture (CORBA) objects or CORBA-like objects. In a similar manner, the applications may also be organized as objects such as CORBA objects. However, it is appreciated that the features of the present invention are not limited in application to CORBA-like objects.

As will be seen, in accordance with the present invention, different versions of the operating system, operating system extensions, and applications may be implemented across the cluster 200; that is, the present invention allows for different versions of software to inter-operate. This feature can be particularly valuable during rolling upgrades, when different versions of software may be in use on different computer systems or nodes within the cluster.

Figure 3:
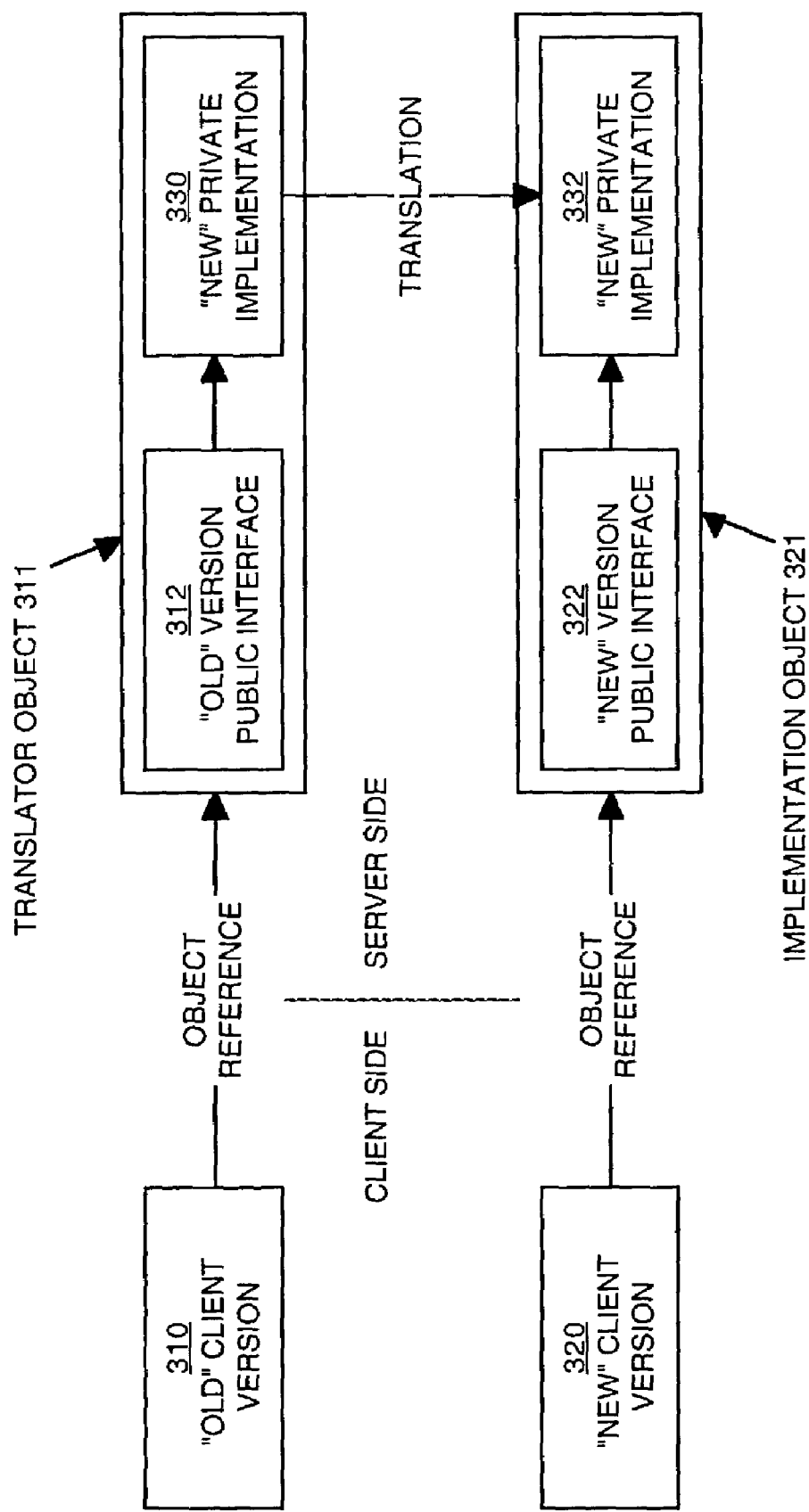
FIG. 3 illustrates a relationship between different versions of software components according to one embodiment of the present invention.

FIG. 3 illustrates a relationship between different versions of software components according to one embodiment of the present invention. For simplicity of discussion, one version is often referred to herein as the "old" version and the other version as the "new" version. However, it is appreciated that such terms are intended to distinguish one version from the other and that, generally speaking, what is of significance is that the versions are different from each other. In fact, one version may be newer than the other, but it is possible to roll back from a newer version to a previously used version (thus, the most recent version may be an older version).

Also, reference is frequently made herein to "client nodes" and "server nodes." It is appreciated that these terms may refer to different computer systems, or to the same computer system. That is, a client node and a server node may each be located on a single computer system or they may be located on different computer systems. Similarly, a node operating with one version of software and a node operating with a different version of software may coexist on the same computer system, or these nodes may be on different computer systems. Also, in an object-oriented infrastructure, objects may perform dual roles as clients and servers; an object may request a service from one object while providing service to another object.

With object-oriented (e.g., CORBA-like) software, an implementation object resides on a server node and is available by reference from a client node. On the client side, one client node may support one (e.g., "old") software version 310 and another client node may support a different (e.g., "new") software version 320; that is, in an object-oriented infrastructure, one client may invoke a reference to the older version of an implementation object, and another client may invoke a reference to the newer version of an implementation object.

In the present embodiment, implementation object 321 is a newer version of a particular implementation object. The public interface 312 for the older version is not changed when a newer version (e.g., implementation object 321) is introduced. A new public interface 322 is specified for the new version of software (implementation object 321). The old public interface 312 and the new public interface 322 are each identifiable by a unique identifier (e.g., a TypeID).

In one embodiment, the identifiers are specified according to an IDL specification. To permit this, the IDL specification is augmented with version information. The IDL specification (interface) for a new version of a software component identifies the associated translator interfaces, to link the new interface with its translators. The following example illustrates an instance in which three older version (version N) interfaces are replaced by one newer version (version N+1) interface:

```
module file {// Version N
    interface file_control    { void foo(); };
    interface file_attr       { void foo(); };
    interface file_cache      { void foo(); };
};
module file_new {// Version N+1
    interface file_obj
        [ translator file::file_control,
                     file::file_attr,
                     file::file_cache ]
        {
            void foo();
            void bar();
        }
};
```

In accordance with the present embodiment of the present invention, in order for the new implementation object 321 to support the old public interface 312, a translator object 311 is introduced. The translator object 311 supports the public interface associated with the old client version 310. In effect, translator object 311 provides an additional face for implementation object 321 that is used with old client version 310. Translator object 311, in essence, implements old methods using the new methods of implementation object 321 (e.g., using the new private implementation 332). The translation method is provided by new private implementation 330 of translator object 311. An example implementation is described below in conjunction with FIG. 5.

Continuing with reference to FIG. 3, the translator object 311 can optionally include data members. A translator object is created for each version of software, and there can be any number of translator objects, depending on the number of versions of software that are to be supported. In one embodiment, a translator object is constructed only for those versions of software that are running on a node in a cluster. In another embodiment, when an implementation object is eliminated, the associated translators are also eliminated. Also, in one embodiment, there is no separate reference counting for a translator, thereby reducing run times when multiple versions are to be supported in a cluster.

In the present embodiment, translator object 311 is co-located with implementation object 321. Old client version 310 invokes an object reference that includes the identifier associated with translator object 311. New client version 320 invokes an object reference that includes the identifier associated with implementation object 321. In this manner, depending on the software version supported by the client node, an invocation request is directed to the appropriate object on the server node. This is described further in conjunction with FIGS. 4A, 4B and 4C.

Because translator object 311 and implementation object 321 of FIG. 3 are co-located, they can be represented by a single address or xdoor. Accordingly, an object reference can act as a proxy for a new object version on client nodes supporting the new version, and also as a proxy for an old object version on client nodes that support an old version, regardless of how the object reference reaches the client node. Note that an object reference can reach a client node either from a server node directly, or indirectly from another client node (refer also to FIG. 6, below).

Figure 4A:
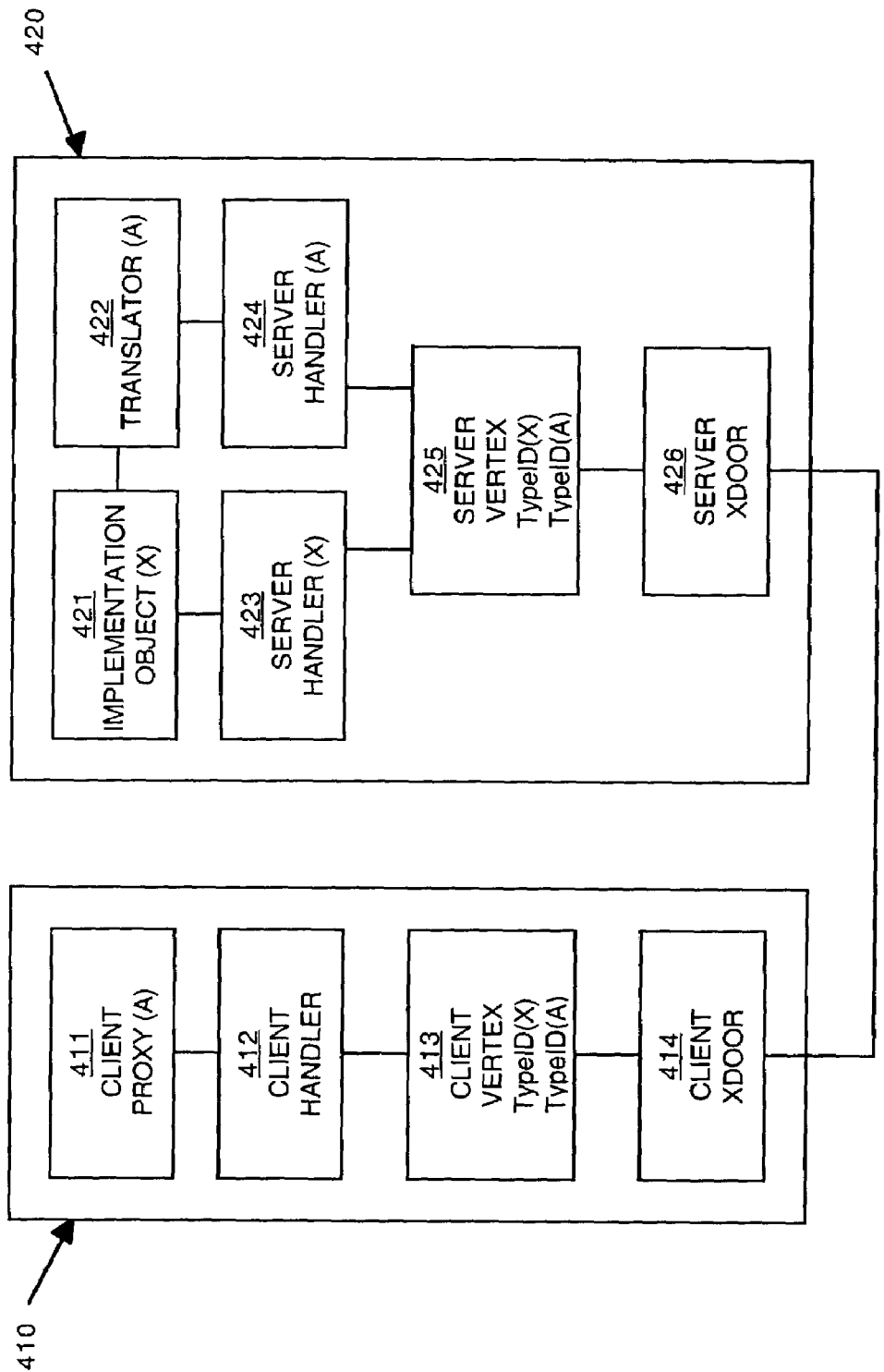
FIG. 4A illustrates a one-to-one relationship between interfaces in an object-oriented software infrastructure according to one embodiment of the present invention.
Figure 4B:
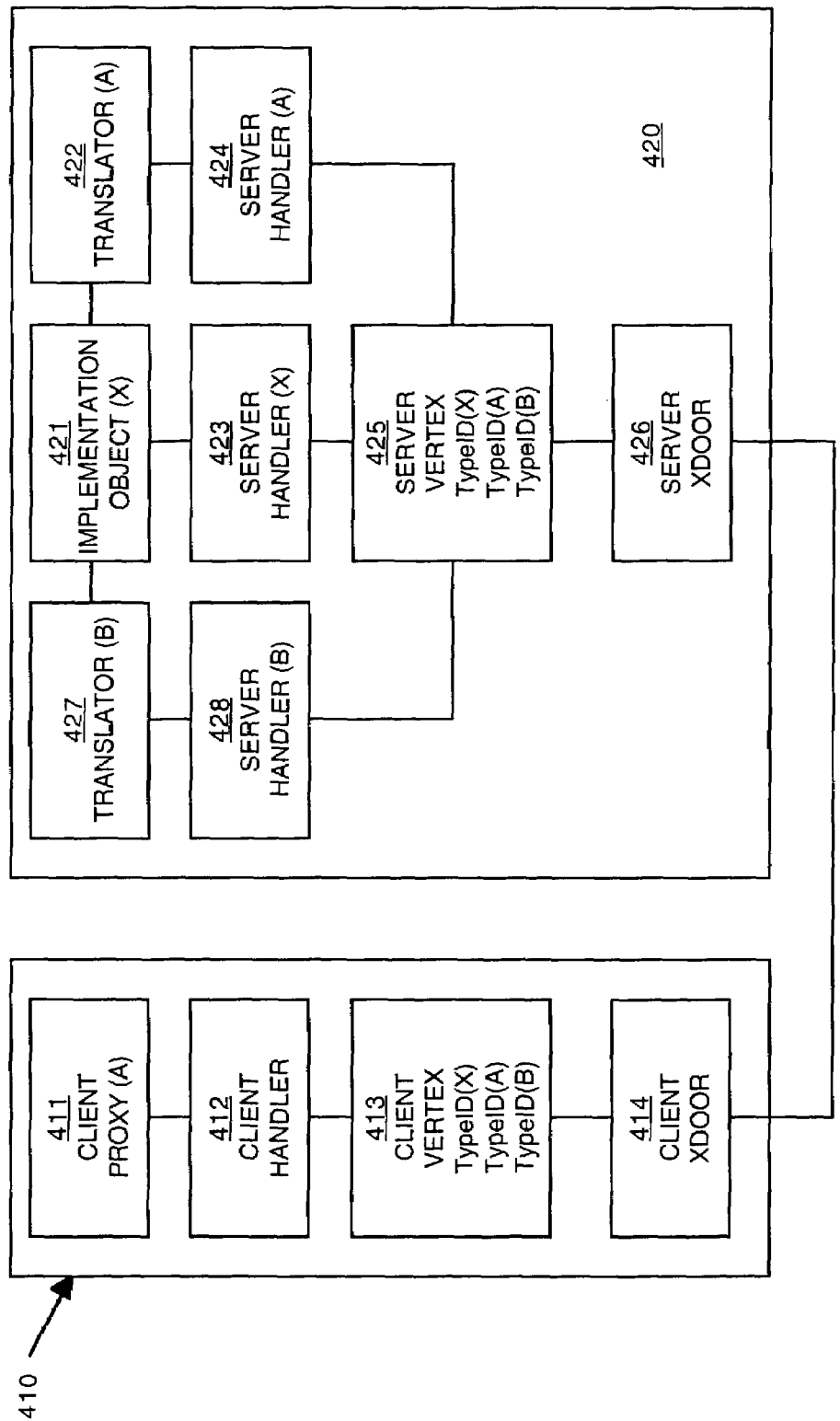
FIG. 4B illustrates a many-to-one relationship between interfaces in an object-oriented software infrastructure according to one embodiment of the present invention.
Figure 4C:
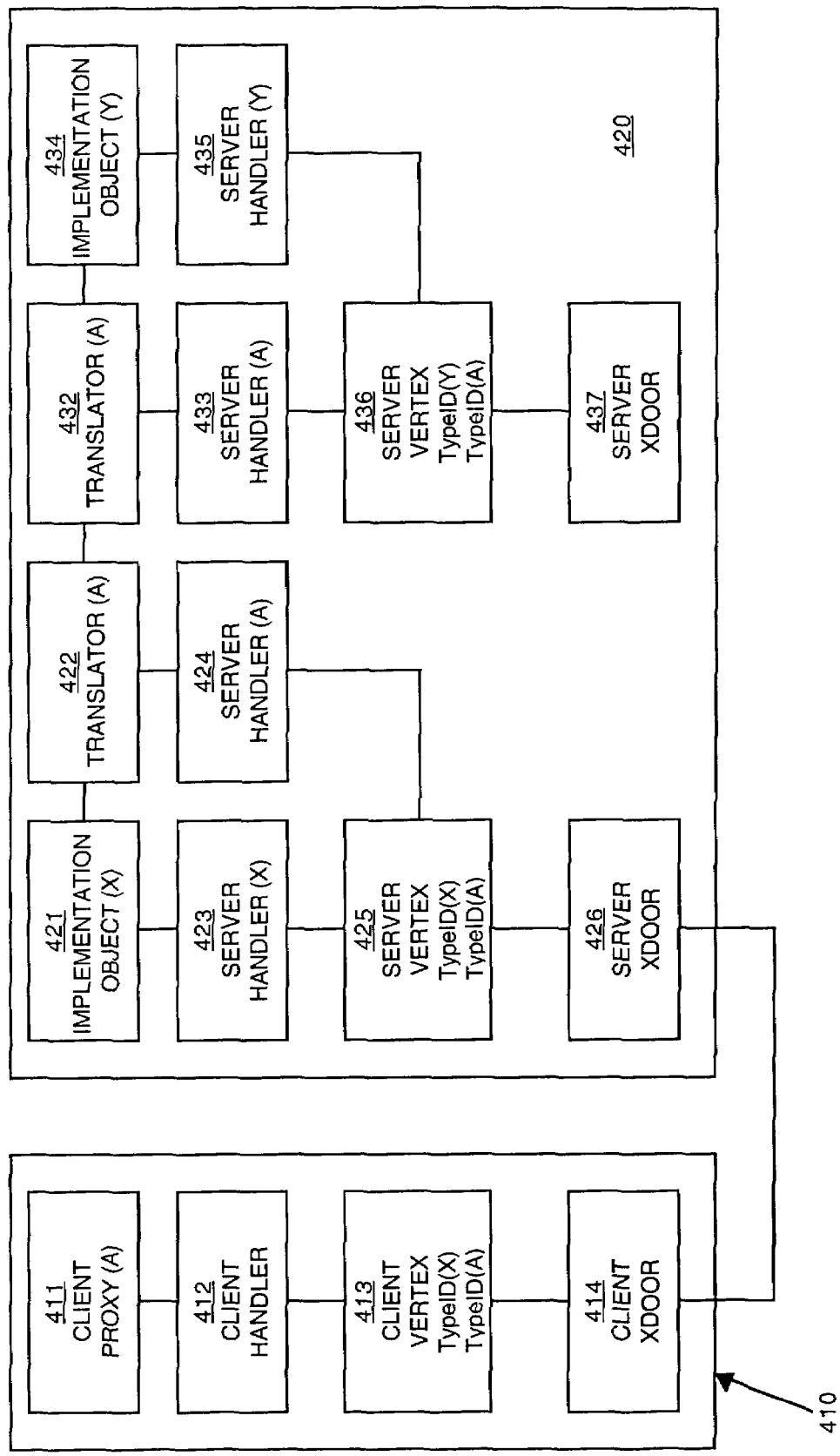
FIG. 4C illustrates a one-to-many relationship between interfaces in an object-oriented software infrastructure according to one embodiment of the present invention.

FIG. 4A illustrates a one-to-one relationship between interfaces in an object-oriented software infrastructure according to one embodiment of the present invention. FIG. 4B illustrates a many-to-one relationship between interfaces in an object-oriented software infrastructure according to one embodiment of the present invention. FIG. 4C illustrates a one-to-many relationship between interfaces in an object-oriented software infrastructure according to one embodiment of the present invention.

Referring first to FIG. 4A, a client node 410 is coupled with a server node 420. As previously mentioned, the client and server nodes may reside on the same computer system, or they may be on different computer systems.

In FIG. 4A, the older version of software (e.g., a software component or object) is designated as "A" while the newer (different) version is designated as "X." In an object-oriented infrastructure, particularly a CORBA-like infrastructure, client node 410 includes a client proxy 411 for the older version, a client handler 412 associated with the client proxy 411, and a client xdoor 414. According to the present embodiment of the present invention, a client vertex 413 is introduced. The client vertex 413 is an index or listing of identifiers (TypeIDs), including an identifier for the newer version X of implementation object 421 and for each translator object associated with that implementation object. In general, client vertex 413 includes a full list of supported software versions that client node 410 is aware of. In the example of FIG. 4A, there is a single translator 422 associated with the older version A; accordingly, client vertex 413 includes TypeID(X) and TypeID(A). If there were other software versions (e.g., B, C, . . . ), then a translator object would be created for and associated with each of the versions, and client vertex 413 would include a TypeID for each of the versions (e.g., TypeID(B), etc.).

In the object-oriented infrastructure of FIG. 4A, server node 420 includes the newer version X of the implementation object 421, a server handler 423 associated with the implementation object 421, a translator 422 associated with the older version A of the implementation object, and a server handler 424 associated with translator 422.

In the present embodiment, because the translator 422 and the implementation object 421 are co-located, a single address can be used for both of these software components. Accordingly, in a CORBA-like infrastructure, a single server xdoor 426 may be used for both of these objects. A server vertex 425 is introduced to de-multiplex requests that arrive at server xdoor 426, in order to direct the requests to either implementation object 421 or translator 422. In the present embodiment, server vertex 425 includes a list of entries, each entry including an identifier and a link to a respective handler. In the example of FIG. 4A, server vertex 425 includes an identifier TypeID(X) associated with server handler 423, and an identifier TypeID(A) associated with server handler 424. According to the present embodiment, an invocation request will include an identifier (TypeID) for either implementation object 421 or translator 422, depending on the version of software supported by the requesting client node. Server vertex 425 uses the TypeID to essentially direct the request to the server handler associated with the object identified by the invocation request. That is, for example, if the invocation request includes TypeID(X), then server vertex 425 links the request to server handler 423; and if the invocation request includes TypeID(A), then server vertex links the request to server handler 424.

In practice, the embodiment illustrated by FIG. 4A is described by the following example. When server node 420 creates (adds) implementation object 421 of version X, a translator 422 for version A is also created. In a CORBA-like embodiment, this latter function is performed by the Object Request Broker (ORB). The ORB examines the interface descriptor (referred to in CORBA as an "InterfaceDescriptor"), which includes information and methods for each instance of an interface, and creates a translator for each interface so identified.

In the present embodiment, server handlers 423 and 424 are created and associated with implementation object 421 and translator 422, respectively. A server vertex 425, linking the respective identifiers to the server handlers 423 and 424 (and implicitly to implementation object 421 and translator 422), is also created. The server xdoor 426 is also created.

In this example, an object reference is marshaled to client node 410. The marshaled object reference includes the list of identifiers from server vertex 425. Upon unmarshaling the object reference, client node 410 creates client xdoor 414. The list of identifiers is stored in client vertex 413. Client node 410 will create a proxy for the newest version of software that it has knowledge of. In the example of FIG. 4A, client node 410 selects version A, representing the newest version that it can support. Accordingly, client node 410 creates a client handler 412 and a client proxy 411 for version A. Although client node 410 utilizes version A, the full list of TypeIDs is retained in client vertex 413, for use if the object reference is passed from client node 410 to another node (refer also to FIG. 6, below).

FIG. 4A thus depicts the object-oriented infrastructure resulting from the example just described. Note that if, instead of version A, client node 410 supported version X, then a similar process is followed to create a client handler and a client proxy for that version.

Although the above discussion primarily focuses on one old version and one new version, aspects of the present invention are extendable to situations involving multiple older versions. For example, the interface (IDL specification) for a translator for an old version can also specify a translator for an even older version. Consider a current version N of an implementation object, a preceding (older) version N−1 and an even older version N−2. Version N−1 can be implemented using a translator associated with version N. Version N−2 can be implemented using a translator associated with version N, or using a translator associated with version N−1 (which in turn is implemented using the translator associated with version N). This approach is recursive and can support virtually any number of versions.

Two special instances are next discussed. In the first, when a new software version is introduced, an IDL compiler may not be provided with an interface (IDL specification) for a translator. In this case, in one embodiment, the assumption is made that the older version associated with the translator is retired from use, and thus does not exist. In the second instance, a client node that supports an older version may receive an object reference to a new version that has no corresponding older version. In this case, in one embodiment, the node unmarshals the object reference as a CORBA::Object. A TypeID may not be marshaled, but it is assumed to be included in the client vertex listing.

With reference now to FIG. 4B, older versions of software (e.g., a software component or object) are designated as "A" and "B," while the newer (different) version is designated as "X." Here, one new interface replaces two older interfaces. The object-oriented infrastructure of FIG. 4B behaves in a fashion similar to that described for FIG. 4A. When implementation object 421 of version X is created, a translator 422 for version A and a translator 427 for version B are also created. In the present embodiment, server handlers 423, 424 and 428 are created and associated with implementation object 421, translator 422, and translator 427, respectively. A server vertex 425, linking the respective identifiers to the server handlers 423, 424 and 428 (and implicitly to implementation object 421, translator 422 and translator 427), is also created. In this case, in comparison to FIG. 4A, server vertex 425 also includes TypeID(B). The server xdoor 426 is also created.

In this example, an object reference is marshaled to client node 410. The marshaled object reference includes the list of identifiers from server vertex 425. Upon unmarshaling the object reference, client node 410 creates client xdoor 414. The supported list of identifiers is stored in client vertex 413. Client node 410 will create a proxy for the newest version of software that it has knowledge of. In the example of FIG. 4A, client node 410 selects version A, representing the newest version that it can support. Accordingly, client node 410 creates a client handler 412 and a client proxy 411 for version A. Although client node 410 utilizes version A, the full list of TypeIDs is retained in client vertex 413, for use if the object reference is passed from client node 410 to another node (refer also to FIG. 6, below).

FIG. 4B thus depicts the object-oriented infrastructure resulting from the example just described. Note that if, instead of version A, client node 410 supported version B or version X, then a similar process is followed to create a client handler and a client proxy for the supported version.

In the example just described, client node 410 supports all of the old version objects, which in the example are versions A and B. The system chooses the correct type. The object references are obtained through invocation requests. The invocation reply parameters are typed. This information informs the system as to whether the object reference should be used as a version A or as a version B object reference, and thus eliminates any ambiguity. Note that if, instead of version A, the invocation reply parameter specified version B, then a similar process is followed to create a client handler and a client proxy for version B. Furthermore, note that it client node 410 supported the new version X, then a similar process is followed to create a client handler and a client proxy for version X.

With reference now to FIG. 4C, newer versions of software (e.g., a software component or object) are designated as "X" and "Y," while the older (different) version is designated as "A." Here, two new interfaces replace one older interface. The infrastructure described by FIG. 4C behaves similarly to that of FIG. 4A, in this case for each of the two newer versions X and Y. FIG. 4C depicts a situation in which client node 410 supports version A. As a result, separate translators 422 and 432 of type A are created for each implementation object 421 and 434, respectively. To control complexity in this situation, an object reference may be made visible only when all needed objects exist. Also, the mapping between old and new versions—between the translators 422 and 432 and the implementation objects 421 and 434—can also be selectively controlled.

When an old version invocation reply specifies a reply parameter object reference for a version A object reference, the system has the choice of providing either a version X or a version Y object reference in the list of supported versions. The software engineer/designer can make the choice of providing either version X or version Y.

Figure 5:
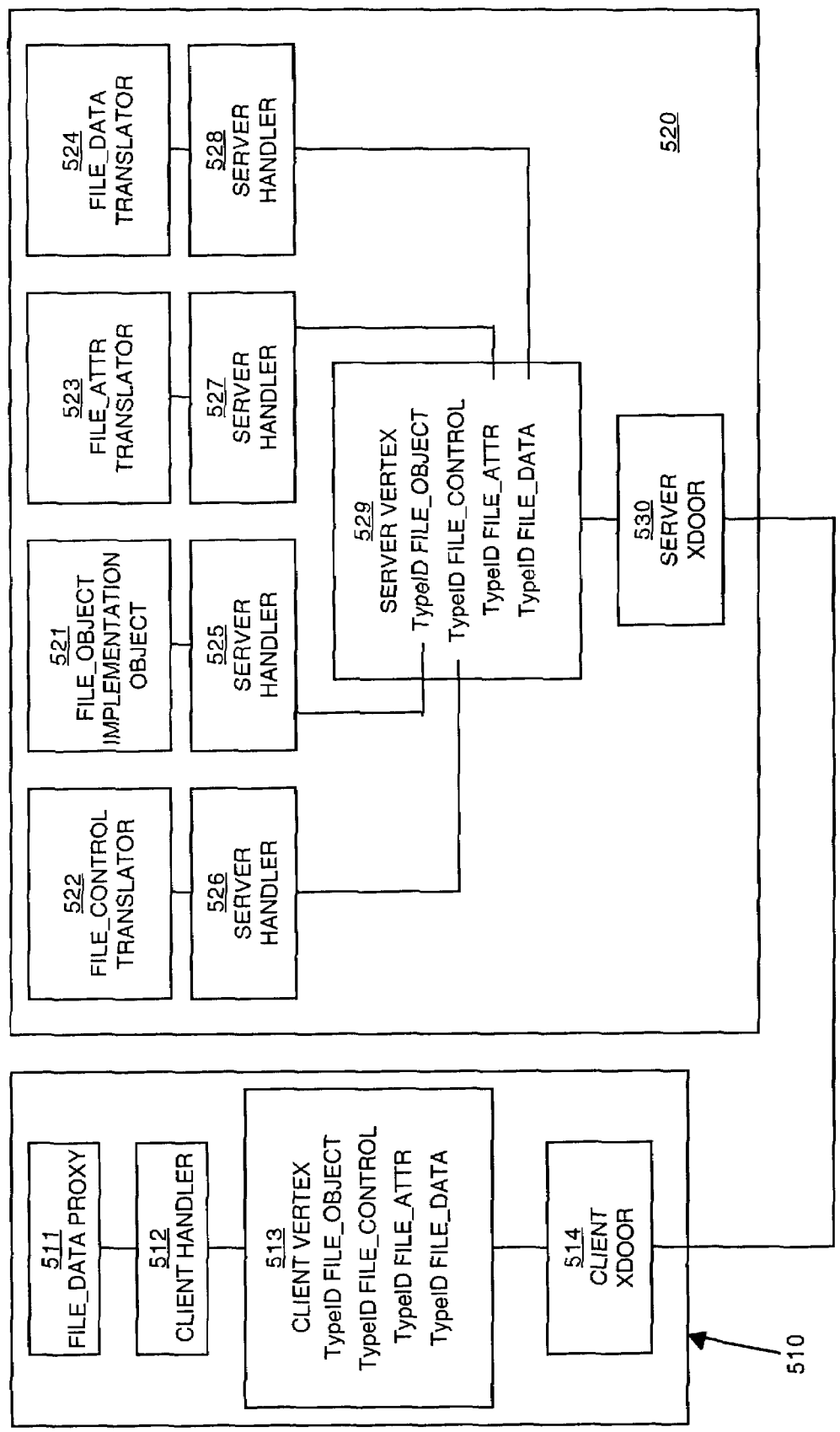
FIG. 5 illustrates an exemplary object-oriented software infrastructure according to one embodiment of the present invention.

FIG. 5 illustrates an exemplary object-oriented software infrastructure according to one embodiment of the present invention. In this example, server node 520 includes file_object implementation object 521, associated with translators that include file_control translator 522, file_attr translator 523, and file_data translator 524. Server handlers 525, 526, 527 and 528 are associated with file_object implementation object 521, file_control translator 522, file_attr translator 523, and file_data translator 524, respectively. Server vertex 529 includes TypeIDs (identifiers) for each of these handlers/objects. A single server xdoor 530 is also used.

On the client node 510, upon unmarshaling of the object reference for the file_object implementation object 521, a client xdoor 514, and client vertex 513 are created as previously described herein. In this example, a file_data proxy 511 and associated client handler 512 are also created as previously described herein.

The following example illustrates a translator implementation in the context of FIG. 5:

```
class file_control_impl :
server_object_template<file::file_control>
{
public:
    file_control_impl (file_object_impl *filep) :
        file_objectp (filep)
        { }
    void lock()         { file_objectp->lock(); }
    void unlock()       { file_objectp->unlock(); }
private
    //
    // Pointer to new implementation object
    //
    file_object_impl *file_objectp;
};
```

Figure 6:
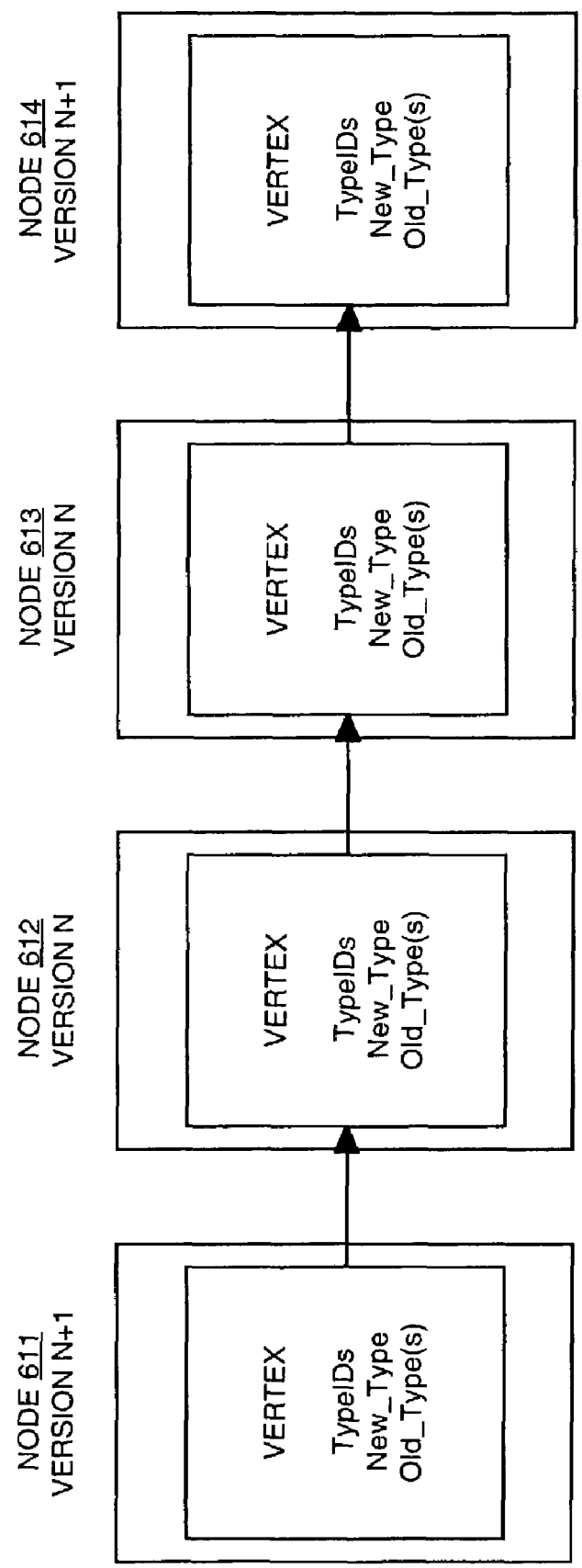
FIG. 6 illustrates the passing of interface identifiers between nodes according to one embodiment of the present invention.

FIG. 6 illustrates the passing of interface identifiers between nodes according to one embodiment of the present invention. In this embodiment, node 611 is a server node, while nodes 612, 613 and 614 are client nodes. According to the various embodiments of the present invention, the full list of identifiers is maintained at each node, independent of the version of software supported by that node. Thus, for example, node 613, which implements an older version N, can still pass to node 614 the identifier associated with the newer version N+1.

Figure 7:
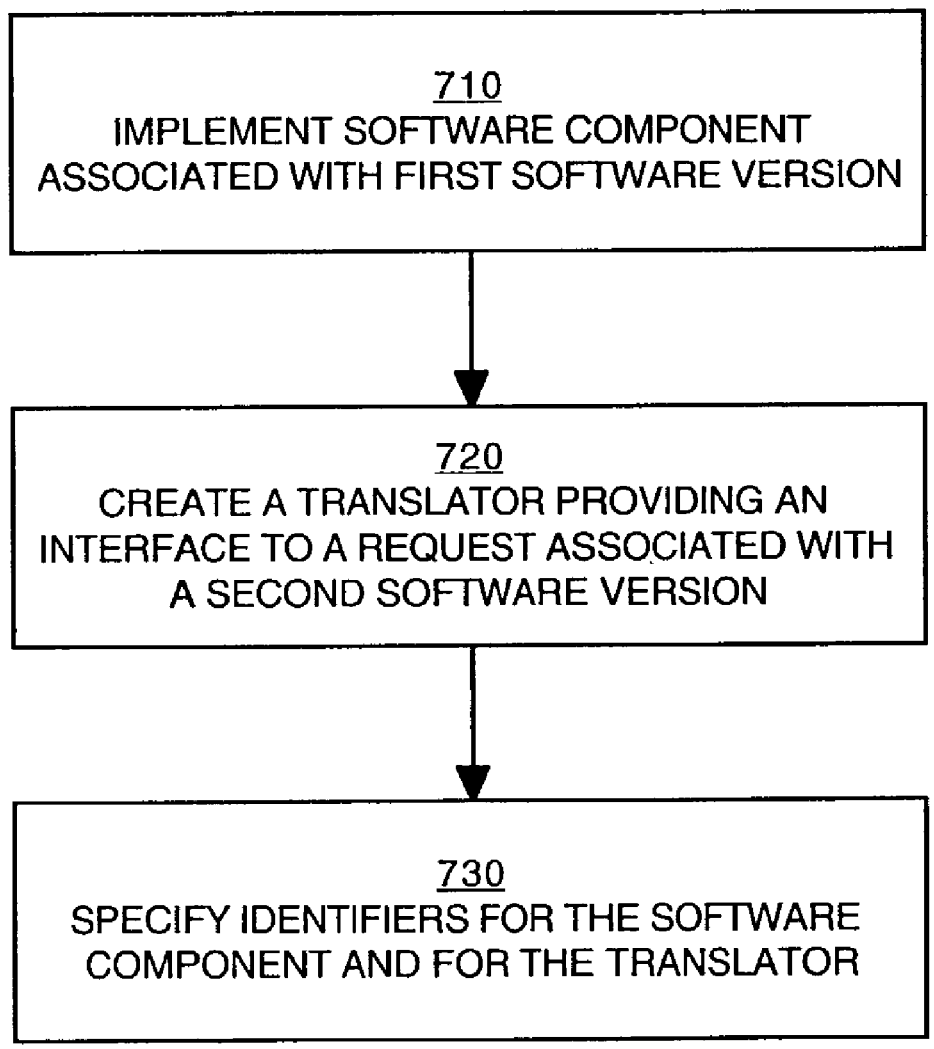
FIG. 7 is a flowchart of a server node method for implementing different versions of software according to one embodiment of the present invention.
Figure 8:
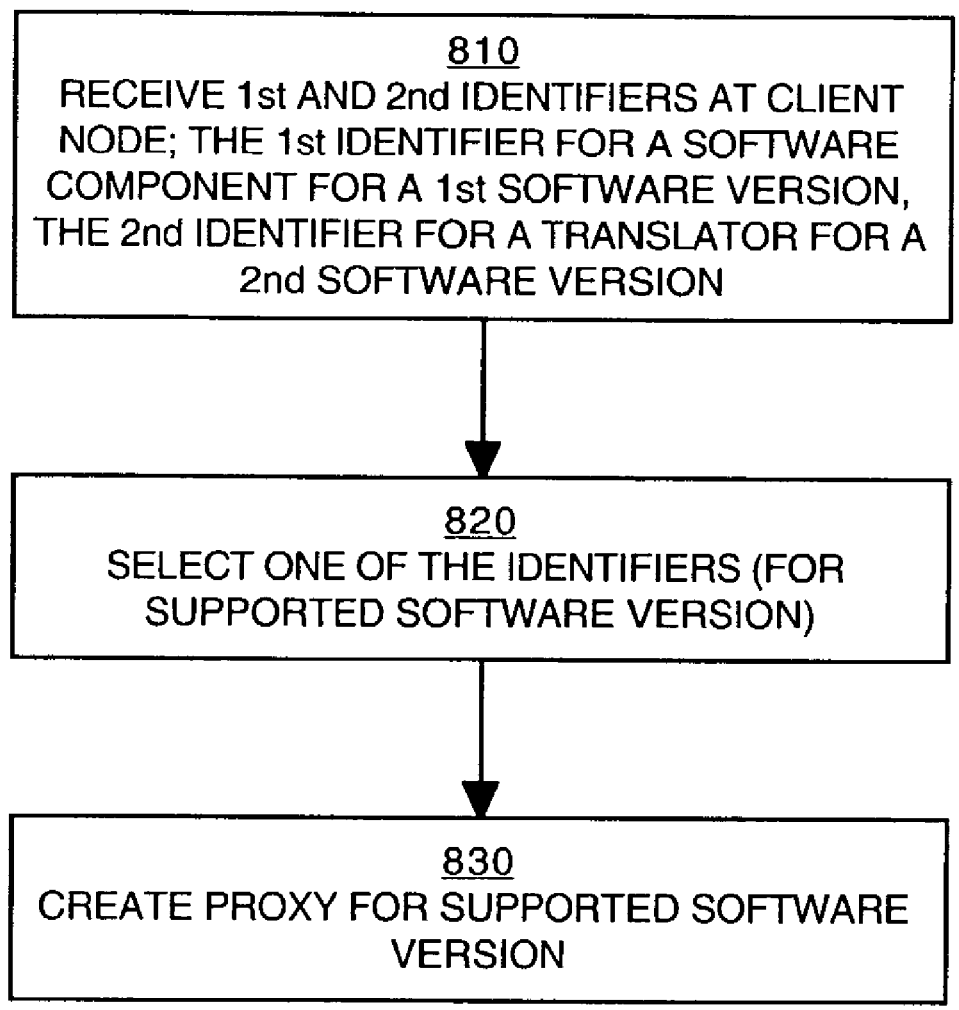
FIG. 8 is a flowchart of a client node method for implementing different versions of software according to one embodiment of the present invention.
Figure 9:
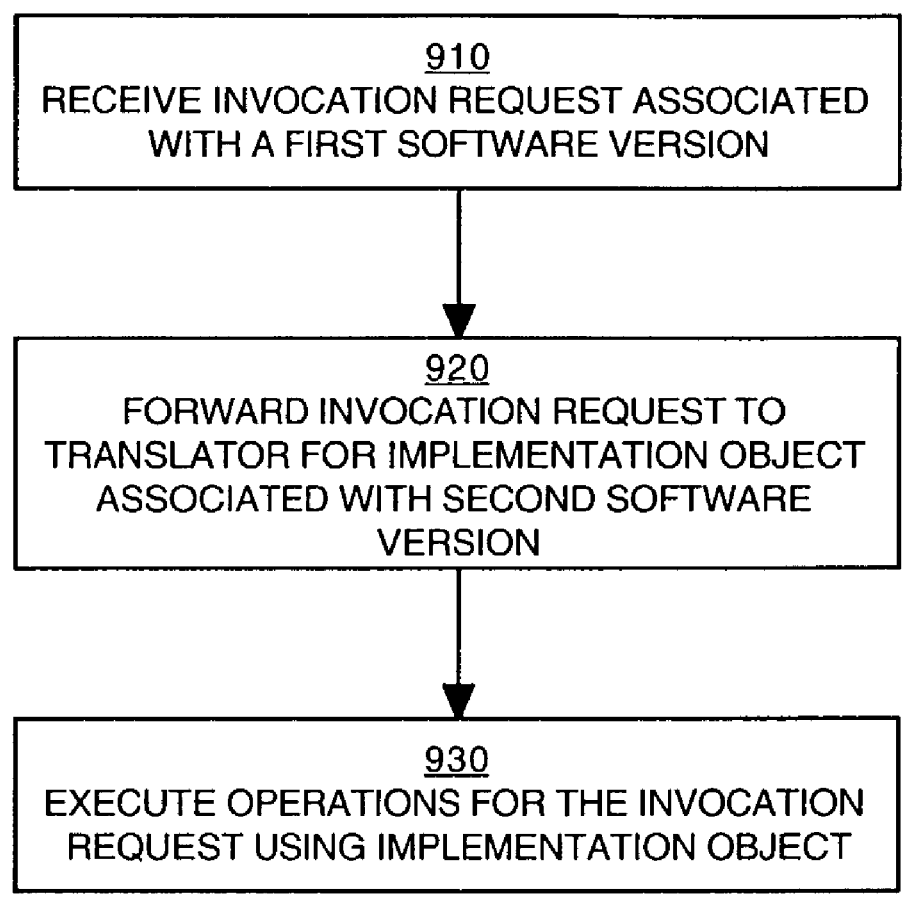
FIG. 9 is a flowchart of a server node method for handling an invocation request according to one embodiment of the present invention.

FIGS. 7, 8 and 9 are flowcharts 700, 800 and 900, respectively, of methods for implementing different versions of software according to various embodiments of the present invention. Although specific steps are disclosed in flowcharts 700, 800 and 900, such steps are exemplary. That is, embodiments of the present invention are well suited to performing various other steps or variations of the steps recited in flowcharts 700, 800 and 900. It is appreciated that the steps in flowcharts 700, 800 and 900 may be performed in an order different than presented, and that not all of the steps in flowcharts 700, 800 and 900 may be performed. All of, or a portion of, the methods described by flowcharts 700, 800 and 900 may be implemented using computer-readable and computer-executable instructions which reside, for example, in computer-usable media of a computer system. Typically, flowchart 700 and flowchart 900 are typically implemented by a server node, while flowchart 800 is typically implemented by a client node.

Referring first to step 710 of FIG. 7, in the present embodiment, a component of software (e.g., an implementation object such as implementation object 421 of FIGS. 4A, 4B and 4C) is implemented. The component of software is associated with one version of the software. In one embodiment, a handler (e.g., handler 423 of FIGS. 4A, 4B and 4C) that is associated with the component is also created.

In step 720 of FIG. 7, in the present embodiment, a translator (e.g., translator 422 of FIGS. 4A, 4B and 4C) is created. The translator provides an interface to the component (e.g., to the implementation object) for an invocation request that is associated with another version of the software (e.g., a version different than that of the implementation object). In one embodiment, a handler (e.g., translator 424 of FIGS. 4A, 4B and 4C) that is associated with the translator is also created.

In step 730 of FIG. 7, in the present embodiment, a unique identifier is specified for the component, and another unique identifier is specified for the translator. In one embodiment, the identifiers are maintained in an index (e.g., vertex 425 of FIGS. 4A, 4B and 4C). The index (vertex) is used to link to a component (e.g. an implementation object or translator) an invocation request that includes the identifier for that component.

With reference now to step 810 of FIG. 8, in the present embodiment, first and second identifiers (e.g., TypeIDs) are received at a client node (e.g., client node 410 of FIGS. 4A, 4B and 4C). The first identifier is uniquely associated with a component of software (e.g., an implementation object such as implementation object 421 of FIGS. 4A, 4B and 4C) implemented by a server node (e.g., server node 420 of FIGS. 4A, 4B and 4C). The second identifier is uniquely associated with a translator (e.g., translator 422 of FIGS. 4A, 4B and 4C) implemented on the server node (e.g., server node 420). The component and the translator, and hence the first and second identifiers, are associated with different versions of the software.

In step 820 of FIG. 8, in the present embodiment, the client node (e.g., client node 410) selects one of the identifiers, depending on the version of software supported by the client node. In one embodiment, although one of the identifiers may be selected, the client node maintains a full listing or index (e.g., vertex 413 of FIGS. 4A, 4B and 4C) of the identifiers that are received.

In step 830 of FIG. 8, in the present embodiment, the client node creates a proxy (e.g., proxy 411 of FIGS. 4A, 4B and 4C) that is associated with the version of software supported by the client (and the version of software associated with the selected identifier).

With reference now to step 910 of FIG. 9, an invocation request is received from a client node (e.g., client node 410 of FIGS. 4A, 4B and 4C). The invocation request is associated with a particular version of software that is different from the version of software associated with an implementation object (e.g., implementation object 421 of FIGS. 4A, 4B and 4C). The invocation request includes a reference identifier (e.g., a TypeID) for a translator (e.g., translator 422 of FIGS. 4A, 4B and 4C) that is associated with a version of software different from that of the implementation object.

In step 920 of FIG. 9, in the present embodiment, the invocation request is forwarded to the translator. In one embodiment, the identifier provided by the invocation request is located in a list of identifiers (e.g., vertex 425 of FIGS. 4A, 4B and 4C). In this embodiment, the list (vertex) provides a link between the identifier and the translator.

In step 930 of FIG. 9, in the present embodiment, the translator executes operations according to the invocation request, using the methods of the implementation object.

In summary, embodiments of the present invention pertain to a method and system thereof for supporting multiple versions of software across a cluster, including software that is organized as components, such as objects. The embodiments of the present invention introduce a translator and a vertex, along with features for creating and identifying the translator and vertex, as well as for integrating the translator and vertex into an object-oriented infrastructure. The translator enables relationships between different (e.g., old and new) versions of software. The vertex enables one object reference to be used on nodes that may be running different versions of software. In its various embodiments, the present invention lends itself to rolling upgrades, so that upgrades to software can be made without interrupting service. Different versions of software can interoperate. Older versions of the software do not require knowledge of a newer version. The overhead associated with software upgrades—for example, the scope of changes and the corresponding amount of effort—can be reduced.

Embodiments of the present invention are thus described. While the present invention has been described in particular embodiments, it should be appreciated that the present invention should not be construed as limited by such embodiments, but rather construed according to the below claims.

What is claimed is:

1. A method implemented by a computer to provide access to a software program, the method comprising:
   receiving a client request to invoke the software program, the client request including information that can be used to determine a particular version of the software program that the client request is compatible with;
   determining, based upon the information in the client request whether the client request is compatible with a current version of the software program;
   if the client request is compatible with the current version of the software program, forwarding the request to the current version of the software program;
   if the client request is not compatible with the current version of the software program:
      determining whether the current version is higher or lower than the particular version;
      if the current version is higher than the particular version:
         translating the client request into a higher version translated request that is compatible with the current version of the software program, wherein translating the client request into a higher version translated request comprises using a higher version translator object; and
         forwarding the higher version translated request to the current version of the software program;
      if the current version is lower than the particular version:
         translating the client request into a lower version translated request that is compatible with the current version of the software program, wherein translating the client request into a lower version translated request comprises using a lower version translator object; and
         forwarding the lower version translated request to the current version of the software program.

2. The method of claim 1, wherein the current version of the software program comprises an upgraded component.

3. The method of claim 2, wherein the upgraded component comprises a Common Object Request Broker Architecture (CORBA) object.

4. The method of claim 1, wherein the information that can be used to determine a particular version of the software program that the client request is compatible with includes an identifier to identify one of the lower version translator object, the higher version translator object, and the current version of the software program.

5. The method of claim 4, wherein the identifier is specified according to an Interface Definition Language (IDL) specification.

6. The method of claim 4, further comprising:
   if the current version is lower than the particular version, creating a lower version index comprising a set of lower version identifiers, the lower version index comprising at least a link to the lower version translator object and a link to the current version of the software program; and
   if the current version is higher than the particular version, creating a higher version index comprising a set of higher version identifiers, the higher version index comprising at least a link to the higher version translator object and a link to the current version of the software program.

7. The method of claim 6 further comprising:
   if the current version is lower than the particular version, sending the lower version index to a client node, whereby the client node evaluates the set of lower version identifiers in the lower version index to create a proxy associated with a version of the software program utilized by the client node; and
   if the current version is higher than the particular version, sending the higher version index to a client node, whereby the client node evaluates the set of higher version identifiers in the higher version index to create a proxy associated with a version of the software program utilized by the client node.

8. The method of claim 4, further comprising:
   if the current version is lower than the particular version:
      creating a first handler associated with the current version of the software program; and
      creating a second handler that is associated with the lower version translator object, wherein the first handler and second handler marshal and unmarshal references to the current version of the software program and the lower version translator object respectively; and
   if the current version is higher than the particular version:
      creating a third handler associated with the current version of the software program; and
      creating a fourth handler that is associated with the higher version translator object, wherein the third handler and fourth handler marshal and unmarshal references to the current version of the software program and the higher version translator object respectively.

9. The method of claim 1, wherein:
   if the current version is lower than the particular version, translating the client request into a lower version translated request comprises:
      identifying a lower version interface indicated by the client request, wherein the lower version interface indicated by the client request includes information and methods associated with the particular version of the software program that the client request is compatible with; and
      invoking the lower version translator object to convert the lower version interface indicated by the client request into a new interface compatible with the current version of the software program; and
   if the current version is higher than the particular version, translating the client request into a higher version translated request comprises:
      identifying a higher version interface indicated by the client request, wherein the higher version interface indicated by the client request includes information and methods associated with the particular version of the software program that the client request is compatible with; and invoking the higher version translator object to convert the higher version interface indicated by the client request into a new interface compatible with the current version of the software program.

10. The method of claim 9, wherein:

if the current version is lower than the particular version, invoking the lower version translator object to convert the lower version interface indicated by the client request into a new interface includes implementing a method from the lower version interface indicated by the client request using a new method associated with the current version of the software program; and if the current version is higher than the particular version, invoking the higher version translator object to convert the higher version interface indicated by the client request into a new interface includes implementing a method from the higher version interface indicated by the client request using a new method associated with the current version of the software program.

11. The method of claim 1, further comprising:

if the current version is lower than the particular version, creating a single reference associated with the upgraded component and the lower version translator object; and if the current version is higher than the particular version, creating a single reference associated with the upgraded component and the higher version translator object.

12. The method of claim 1, wherein the lower version translator object and the higher version translator object comprise one translator object.

13. A computer-readable storage medium comprising instructions, which when executed by one or more processors, cause the one or more processors to perform the steps of:

receiving a client request to invoke the software program, the client request including information that can be used to determine a particular version of the software program that the client request is compatible with;

determining, based upon the information in the client request whether the client request is compatible with a current version of the software program;

if the client request is compatible with the current version of the software program, forwarding the request to the current version of the software program;

if the client request is not compatible with the current version of the software program:

determining whether the current version is higher or lower than the particular version;

if the current version is higher than the particular version:

translating the client request into a higher version translated request that is compatible with the current version of the software program, wherein translating the client request into a higher version translated request comprises using a higher version translator object; and forwarding the higher version translated request to the current version of the software program;

if the current version is lower than the particular version:

translating the client request into a lower version translated request that is compatible with the current version of the software program, wherein translating the client request into a lower version translated request comprises using a lower version translator object; and forwarding the lower version translated request to the current version of the software program.

14. The computer-readable storage medium of claim 13, wherein the current version of the software program comprises an upgraded component.

15. The computer-readable storage medium of claim 14, wherein the upgraded component comprises a Common Object Request Broker Architecture (CORBA) object.

16. The computer-readable storage medium of claim 13, wherein the information that can be used to determine a particular version of the software program that the client request is compatible with includes an identifier to identify one of the lower version translator object, the higher version translator object, and the current version of the software program.

17. The computer-readable storage medium of claim 16, wherein the identifier is specified according to an Interface Definition Language (IDL) specification.

18. The computer-readable storage medium of claim 16, further comprising:

if the current version is lower than the particular version, creating a lower version index comprising a set of lower version identifiers, the lower version index comprising at least a link to the lower version translator object and a link to the current version of the software program; and if the current version is higher than the particular version, creating a higher version index comprising a set of higher version identifiers, the higher version index comprising at least a link to the higher version translator object and a link to the current version of the software program.

19. The computer-readable storage medium of claim 18, further comprising:

if the current version is lower than the particular version, sending the lower version index to a client node, whereby the client node evaluates the set of lower version identifiers in the lower version index to create a proxy associated with a version of the software program utilized by the client node; and if the current version is higher than the particular version, sending the higher version index to a client node, whereby the client node evaluates the set of higher version identifiers in the higher version index to create a proxy associated with a version of the software program utilized by the client node.

20. The computer-readable storage medium of claim 16, further comprising:

if the current version is lower than the particular version:

creating a first handler associated with the current version of the software program; and creating a second handler that is associated with the lower version translator object, wherein the first handler and second handler marshal and umarshal references to the current version of the software program and the lower version translator object respectively; and if the current version is higher than the particular version:

creating a third handler associated with the current version of the software program; and creating a fourth handler that is associated with the higher version translator object, wherein the third handler and fourth handler marshal and unmarshal references to the current version of the software program and the higher version translator object respectively.

21. The computer-readable storage medium of claim 13, wherein:
if the current version is lower than the particular version, translating the client request into a lower version translated request comprises:
identifying a lower version interface indicated by the client request, wherein the lower version interface indicated by the client request includes information and methods associated with the particular version of the software program tat the client request is compatible with; and
invoking the lower version translator object to convert the lower version interface indicated by the client request into a new interface compatible with the current version of the software program; and
if the current version is higher than the particular version, translating the client request into a higher version translated request comprises:
identifying a higher version interface indicated by the client request, wherein the higher version interface indicated by the client request includes information and methods associated with the particular version of the software program that the client request is compatible with; and
invoking the higher version translator object to convert the higher version interface indicated by the client request into a new interface compatible with the current version of the software program.

22. The computer-readable storage medium of claim 21, wherein:
if the current version is lower than the particular version, invoking the lower version translator object to convert the lower version interface indicated by the client request into a new interface includes implementing a method from the lower version interface indicated by the client request using a new method associated with the current version of the software program; and
if the current version is higher than the particular version, invoking the higher version translator object to convert the higher version interface indicated by the client request into a new interface includes implementing a method from the higher version interface indicated by the client request using a new method associated with the current version of the software program.

23. The computer-readable storage medium of claim 13, further comprising:
if the current version is lower than the particular version, creating a single reference associated with the upgraded component and the lower version translator object; and
if the current version is higher than the particular version, creating a single reference associated with the upgraded component and the higher version translator object.

24. The computer-readable storage medium of claim 13, wherein the lower version translator object and the higher version translator object comprise one translator object.

\* \* \* \* \*